(12) United States Patent
Ali

(10) Patent No.: US 6,423,402 B1
(45) Date of Patent: Jul. 23, 2002

(54) BULLETIN BOARD AND METHOD FOR MAKING THE SAME

(76) Inventor: Gregory F. Ali, 2855 Locke Dr., Beavercreek, OH (US) 45324

( * ) Notice: Subject to any disclaimer, the term of this patent is extended or adjusted under 35 U.S.C. 154(b) by 31 days.

(21) Appl. No.: 09/668,928

(22) Filed: Sep. 25, 2000

(51) Int. Cl.[7] .................................................. B32B 3/26
(52) U.S. Cl. ........................ 428/304.4; 428/13; 428/14; 428/81; 428/156; 428/157; 428/158; 428/159; 428/160; 428/161; 428/167; 40/10 R; 40/152; 472/57
(58) Field of Search .............................. 428/304.4, 160, 428/167, 13, 81, 14, 156–161; 40/10 R, 152; 472/87; D19/52, 54

(56) References Cited

U.S. PATENT DOCUMENTS

| | | | |
|---|---|---|---|
| 3,952,133 A | 4/1976 | Amos | 428/354 |
| 4,721,644 A | 1/1988 | Mayo | 428/91 |
| 4,787,516 A | 11/1988 | Morrison | 206/566 |
| 5,009,333 A | 4/1991 | Souders | 211/13 |
| 5,829,215 A | * 11/1998 | Billing | 52/309.4 |

* cited by examiner

Primary Examiner—Blaine Copenheaver
Assistant Examiner—Hai Vo
(74) Attorney, Agent, or Firm—R. William Graham

(57) ABSTRACT

A bulletin board includes a generally planar polyfoam layer having a front surface and a back surface, wherein the back surface includes a recessed surface portion formed therein having an integrally disposed generally planar stiffening member held in place by the polyfoam. The planar stiffening member is preferably a cardboard piece and the polyfoam penetrates a portion of the corrugation from peripheral edges thereof inward. A method of forming the bulletin board is provided.

15 Claims, 2 Drawing Sheets

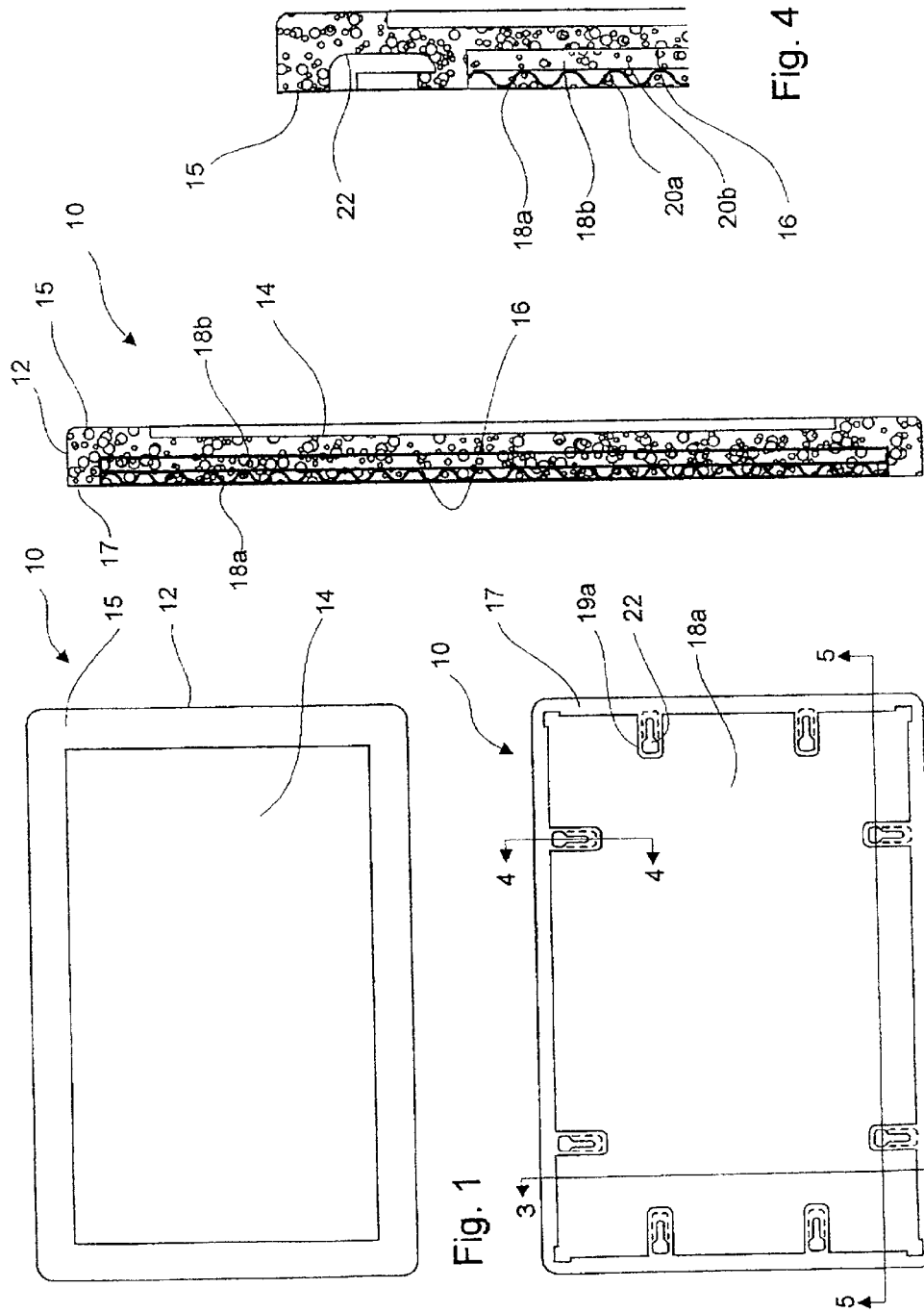

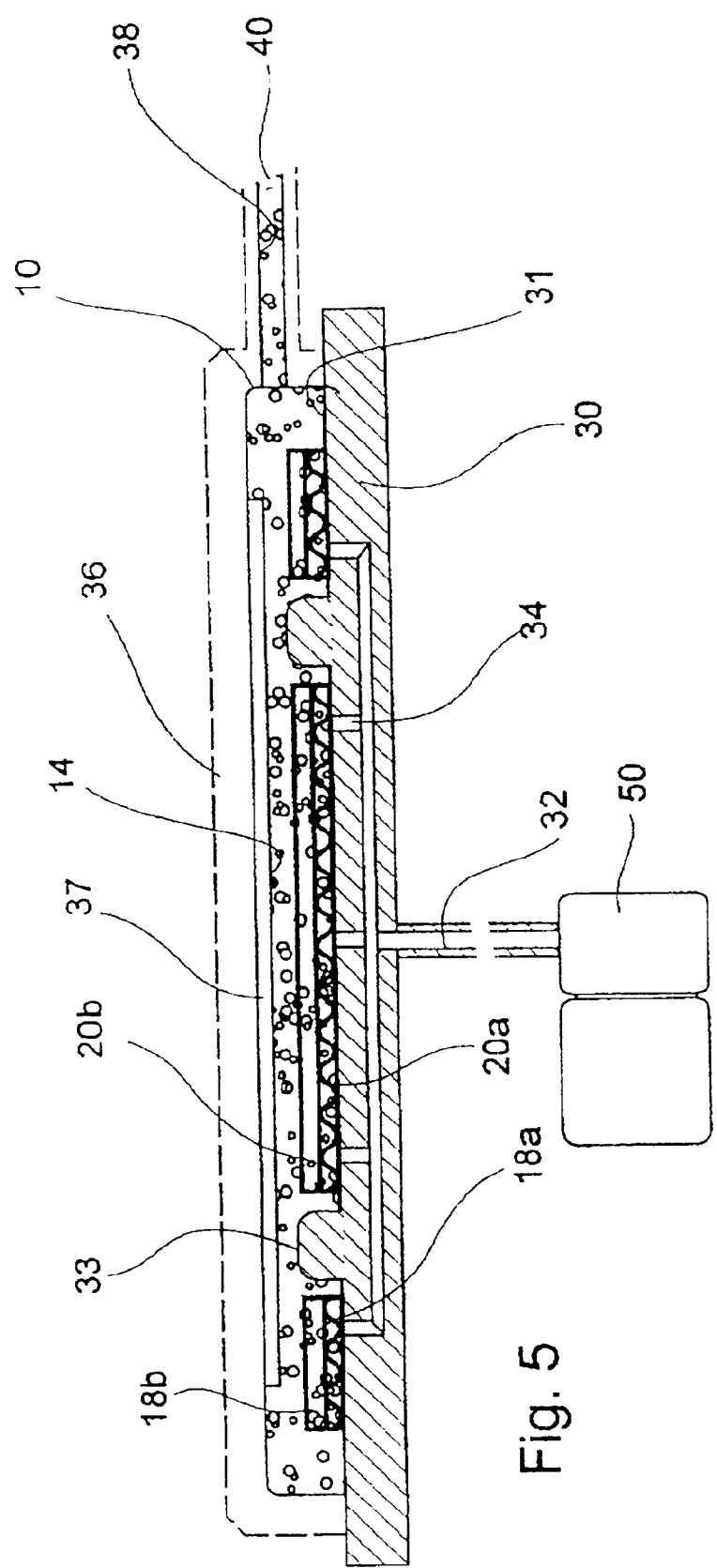

BULLETIN BOARD AND METHOD FOR MAKING THE SAME

BACKGROUND OF THE INVENTION

1. Field of the Invention

The present invention relates to a novel bulletin board onto which items may be pinned. More particularly, the invention relates to a bulletin board and method of making the same from a polyfoam material with a hardback cover. The term "polyfoam" is used herein to describe a foamed polymeric material.

2. Related Art

Bulletin boards have long existed in the form of cork with an adhered rigid backing to give stiffness and support to the cork and with a frame to prevent abrasion along the edge of the cork. This type board has been found to have disadvantages in that the cork tends to wear from pins which are inserted and removed on a frequent basis. Another disadvantage arose in the damage of such boards in shipping process, as well as size of the board for cost purposes. Further, current wall hangers attached to such boards add expense and are often damaged or lost in the shipping process.

One attempt to solve these problems was to provide bendable and shipable bulletin board comprising front and rear layers heat sealed to one another, a foam core between the front and rear layers, and at least one stiffening layer between the front and rear layers. This design has not met commercial acceptance.

Another type of board was adapted to retain paper and other articles without the use of thumb-tacks or other extrinsic fastening means. The display board included a pressure-sensitive adhesive surface onto which paper, cards, coins, keys, and even heavier articles may be removably mounted and retained thereon for extended periods of display by simply pressing the article against the adhesive surface.

While these boards have attempted to solve deficiencies in the art, there remains a need to improve bulletin board designs. Accordingly, the present invention improves upon the art.

BRIEF SUMMARY OF THE INVENTION

It is accordingly an object of the invention to provide an improved bulletin board.

It is a further object of the invention to provide a relatively inexpensive and durable bulletin board.

Still another object is to provide a bulletin board with improved wall mounting means.

Accordingly, the present invention is directed to a bulletin board which includes a generally planar polyfoam layer having a front surface and a back surface, wherein the back surface includes a recessed surface portion formed therein having an integrally disposed generally planar stiffening member held in place by the polyfoam. The planar stiffening member is preferably a cardboard piece and the polyfoam penetrates a portion of the corrugation from peripheral edges thereof inward.

Additionally, an exposed back surface portion surrounding the stiffening member includes a plurality of recessed surface portions to enable the board to be easily mounted to a wall using nails or the like. The stiffening member is preferably sufficiently rearwardly disposed from a front surface of the planar polyfoam such that conventional tack pins do not penetrate the stiffening member.

A method of forming the bulletin board is provided. The method includes positionably disposing a stiffening member on a surface of an injection mold and injecting a polyfoam material around the stiffening member in a manner such that a substantially uniform layer of the polyfoam is integrally connected thereto.

Other objects and advantages will be readily apparent to those skilled in the art upon viewing the drawings and reading the detailed description hereafter.

BRIEF DESCRIPTION OF THE DRAWINGS

FIG. 1 is a front view of the present invention.

FIG. 2 is a back view of the present invention.

FIG. 3 is a cross-sectional view of the present invention through line 3—3 of FIG. 2.

FIG. 4 is an exploded cross-sectional view of a portion of FIG. 2 through line 4—4.

FIG. 5 depicts a method of making the present invention.

DETAILED DESCRIPTION OF THE INVENTION

Referring now to the drawings, the bulletin board is generally designated by the numeral 10. The bulletin board 10 includes a polyfoam layer material 12. The polyfoam layer material 12 can be a polyurethane or like polyfoam which will permit penetration of a pin with a holding action. Its thickness will correspond approximately to that of a pin of a conventional tack.

Formed as a function of the molding process described later herein, the polyfoam material 12 includes a front side 14 having a raised peripheral edge 15 to provide an aesthetic appeace of a conventional bulletin board, as seen in FIG. 1. In viewing FIG. 3, the bulletin board 10 includes a recessed back surface 16 and raised peripheral edge 17. In addition, as shown in FIG. 2, there is a plurality of wall mounting recessed surfaces 22 which are spaced along the peripheral edge 17 and inwardly recessed from the recessed surface 16. In this way, nails or other wall hanger devices can be disposed in the wall mounting recessed surfaces 22 and the bulletin board 10 can be mounted flush with the wall. Also, the opposing relation of the wall mounting surfaces 22 permits the board 10 to be secured at an upper and lower position when attached to a wall to prevent the same from being easily pulled away therefrom.

The bulletin board 10 further preferably includes a plurality of stiffening members 1 8a and 18b, each of which included a plurality of cut out surfaces 19a and 19b (not shown), respectively, which are so configured therein to permit the formation of the wall mounting recessed surfaces 22. FIGS. 3 and 4 depict cross-sections of the bulletin board 10 and the features previously described. The stiffening members 18a and 18b can be a cardboard sheet, rigid plastic sheet or the like. Preferably, a cardboard sheet works well in the invention as the cardboard includes corrugations 20a and 20b, of 18a and 18b, respectively, which permit at least partial filling thereof with polyfoam material from the peripheral edge inward. This partial filling of the corrugations 20a and 20b lend strength to the overall structure of the bulletin board 10 and is uniquely bonded thereto. The members 18a and 18b are preferably cross lapped such that the corrugations 20a and 20b generally run perpendicular to one another. The members 18a and 18b are glued to one another. This overall structure aids to prevent natural curl of the corrugated members 18a and 18b. It is also noted that the polyfoam urethane bonds to the stiffening members 18a and 18b in the molding process.

Turning now to FIG. 5, the molding process is depicted for the present invention. A lower injection molding head portion 30 is provided as having a generally planer surface 31 with a plurality of wall mounting protrusions 33 formed thereon to impart the wall mounting recessed surfaces 22 during the molding process. Also, the injection molding head portion 30 includes a plurality of openings 34 which communicably interconnect with a vacuum inlet 32 which in turn is connected to a vacuum 50. The particular shape or orientation of the openings 34 and 32 can vary to accomplish the invention. In this regard, the stiffening members 18a and 18b can be positioned and held in place on the surface 31 via the vacuum 50.

An upper injection molding head portion is also provided to mate with the lower injection molding head portion 30 in a sealable manner. A protruding flat surface 37, which can have a texture aspect, is provided to impart the form of the surface 14 of the board 10 when formed. A thin slot inlet 38 is provided in the side of the injection molding head portion 36 to enable injection of polyfoam material 40 to be passed therethrough and between the injection molding head portions 30 and 36. The length of the slot inlet 38 is approximate that of the width of the-to-be formed bulletin board 10, wherein the polyfoam material 40 flows over the stiffening members 18a and 18b in a relatively quick manner to assure coverage and filling of the mold as the polyfoam material 40 tends to set quickly. Prior to the injection of the polyfoam material 40, the stiffening members 18a and 18b are disposed in their proper places to insure all vacuum openings 34 are covered and the vacuum is on to create a seal therebetween and substantially prevent any polyfoam material 40 from entering As the polyfoam material 40 enters, a portion thereof flows to fill the open areas. This includes entering and filling at least a portion of the corrugations 20a and 20b.

While the above described embodiments set forth by way of example, they are not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A bulletin board, which includes:
   a generally planer layer made of polyfoam material and having a front surface and a back surface, wherein said back surface includes a recessed surface portion formed therein; and
   a plurality of generally planer stiffening members made of corrugated cardboard integrally disposed in said recessed surface portion and held in place by said polyfoam material wherein said plurality of corrugated cardboard stiffening members are adhered to one another such that corrugations of one stiffening member are not in parallel with corrugations of another stiffening member.

2. The bulletin board of claim 1, wherein said polyfoam penetrates a portion of said corrugation from peripheral edges thereof inward.

3. The bulletin board of claim 1, wherein said generally planer layer has an exposed back surface portion surrounding said stiffening members which includes at least one wall mounting recessed surface portion to enable said bulletin board to be easily mounted.

4. The bulletin board of claim 1, wherein said stiffening members when disposed in said recessed surface is sufficiently spaced from said front surface of said generally planer layer to substantially avoid penetration by a pin or a tack therein when inserted into said generally planer layer.

5. The bulletin board of claim 1, wherein said front surface is textured in a molding process.

6. The bulletin board of claim 1, wherein said stiffening members are bonded to said polyfoam in a molding process.

7. The bulletin board of claim 1, wherein said polyfoam is polyurethane foam.

8. A bulletin board, which includes:
   a generally planer layer made of polyfoam material and having a front surface and a back surface; and
   a plurality of generally planer stiffening members made of corrugated cardboard integrally bonded to said back surface portion and held in place by said polyfoam material wherein said plurality of corrugated cardboard stiffening members are adhered to one another such that corrugations of one stiffening member are not in parallel with corrugations of another stiffening member.

9. The bulletin board of claim 8, wherein said back surface includes a recessed surface portion formed therein and said generally planer stiffening members are disposed therein and integrally connected to said polyfoam material.

10. The bulletin board of claim 9, wherein said polyfoam penetrates a portion of said corrugation from peripheral edges thereof inward.

11. The bulletin board of claim 10, wherein said generally planer layer has an exposed back surface portion surrounding said stiffening members which includes at least one wall mounting recessed surface portion to enable said bulletin board to be easily mounted.

12. The bulletin board of claim 11, wherein said stiffening members when disposed in said recessed surface are sufficiently spaced from said front surface of said generally planer layer to substantially avoid penetration by a pin or a tack therein when inserted into said generally planer layer.

13. The bulletin board of claim 8, wherein said polyfoam is polyurethane foam.

14. A bulletin board, which includes:
   a generally planer layer made of polyfoam material and having a textured front surface and a back surface having a recessed surface portion formed therein; and
   a plurality of stiffening members made of corrugated cardboard members adhered to one another such that the corrugations of one cardboard stiffening member are not in parallel with corrugations of another cardboard stiffening member, said cardboard stiffening members being disposed therebetween and integrally connected by said polyfoam material and integrally bonded to said polyfoam back surface portion and held in place by said polyfoam material, wherein said cardboard stiffening members when disposed in said recessed surface are sufficiently spaced from said front surface of said generally planer layer to substantially avoid penetration by a pin or a tack therein when inserted into said generally planer layer.

15. The bulletin board of claim 14, wherein said polyfoam is polyurethane foam.

* * * * *